United States Patent
Zhang et al.

(10) Patent No.: US 11,379,519 B2
(45) Date of Patent: Jul. 5, 2022

(54) QUERY RESPONSE DEVICE AND METHOD

(71) Applicant: SEOUL NATIONAL UNIVERSITY R&DB FOUNDATION, Seoul (KR)

(72) Inventors: Byoung-Tak Zhang, Seoul (KR); Seong-Ho Choi, Seoul (KR)

(73) Assignee: SEOUL NATIONAL UNIVERSITY R&DB FOUNDATION, Seoul (KR)

( * ) Notice: Subject to any disclaimer, the term of this patent is extended or adjusted under 35 U.S.C. 154(b) by 0 days.

(21) Appl. No.: 17/057,793

(22) PCT Filed: Dec. 9, 2019

(86) PCT No.: PCT/KR2019/017311
§ 371 (c)(1),
(2) Date: Nov. 23, 2020

(87) PCT Pub. No.: WO2020/117028
PCT Pub. Date: Jun. 11, 2020

(65) Prior Publication Data
US 2021/0200803 A1    Jul. 1, 2021

(30) Foreign Application Priority Data

Dec. 7, 2018   (KR) .......................... 10-2018-0157356
Dec. 9, 2019   (KR) .......................... 10-2019-0162788

(51) Int. Cl.
*G06F 16/30*        (2019.01)
*G06F 16/738*       (2019.01)
(Continued)

(52) U.S. Cl.
CPC .......... *G06F 16/738* (2019.01); *G06F 16/743* (2019.01); *G06F 16/7834* (2019.01); *G06F 16/7844* (2019.01); *G06N 3/08* (2013.01)

(58) Field of Classification Search
CPC .. G06F 16/7328; G06F 16/738; G06F 16/743; G06F 16/7834; G06F 16/7844; G06N 3/08
See application file for complete search history.

(56) References Cited

U.S. PATENT DOCUMENTS 9,361,523 B1 *   6/2016   Chen ................... G06K 9/00711
2014/0257995 A1 *  9/2014   Wang ................ H04N 21/44016
                                              705/14.66

(Continued)

OTHER PUBLICATIONS

Article entitled "Hierarchical Video Story Modeling Using Attention Focus According to the Questions", by Choi et al., dated 2018 (Year: 2018).*

(Continued)

*Primary Examiner* — Mahesh H Dwivedi
(74) *Attorney, Agent, or Firm* — Sughrue Mion, PLLC (57) ABSTRACT

A query response method includes: dividing image frames, audio data and caption data included in video data of a data set on a per-shot basis based on the same single caption; extracting a shot feature vector by calculating the feature vectors of image frames, audio data and caption data included in each shot; extracting feature vectors of query data and a plurality of pieces of option data corresponding to the query data from each query-response pair included in the data set; calculating a video feature vector by inputting the shot feature vectors into a multilayer neural network, assigning an attention weight, calculated based on the feature vector of the query data, to output vectors of respective layers, and then summing the weighted output vectors; and selecting a final response from among the plurality of pieces of option data based on similarities between the video feature vector and option feature vectors.

13 Claims, 5 Drawing Sheets

(51) Int. Cl.
  *G06F 16/74* (2019.01)
  *G06F 16/783* (2019.01)
  *G06N 3/08* (2006.01)

(56) References Cited

U.S. PATENT DOCUMENTS

2016/0085860 A1* 3/2016 Wallenberg ............ G06F 16/73 707/706
2018/0359530 A1* 12/2018 Marlow ................ G06F 16/783

OTHER PUBLICATIONS

Article entitled "DeepStory: Video Story QA by Deep Embedded Memory Networks", by Kim et al., dated 2017 (Year: 2017).*
Article entitled "Multimodal dual attention memory for video story question answering", by Kim et al., dated 2018 (Year: 2018).*
Aishwarya Agrawal et al., "VQA:Visual Question Answering", International Conference on Computer Vision (ICCV), arXiv:1505.00468v7, 2016 (25 pages total).
A. Belz et al., "From image to language and back again", Natural Language Engineering, vol. 24, Special Issue 3: Language for Images, 2018, pp. 1-38 (38 pages total).
Makarand Tapaswi et al., "MovieQA: Understanding Stories in Movies through Question-Answering", arXiv:1512.02902v1, 2015, pp. 1-17 (17 pages total).
Kyung-Min Kim et al., "DeepStory: Video Story QA by Deep Embedded Memory Networks", IJCAI, arXiv:1707.00836v1, 2017 (7 pages total).
Steven B. Davis et al., "Comparison of Parametric Representation for Monosyllabic Word Recognition in Continuously Spoken Sentences", IEEE Transactions on Acoustics, Speech, and Signal Processing, vol. ASSP-28, No. 4, 1980, pp. 357-366 (10 pages total).
Suwon Shon et al., "Convolutional Neural-Networks and Language Embeddings for End-to-End Dialect Recognition", The Speaker and Language Recognition Workshop, arXiv:1803.04567v2, 2018 ( 7 pages total).
Matthew E. Peters et al., "Deep Contextualized word representations", NAACL, arXiv:1802.05365v2, 2018 (15 pages total).

* cited by examiner

QUERY RESPONSE DEVICE AND METHOD

CROSS REFERENCE TO RELATED APPLICATIONS

This application is a National Stage of International Application No. PCT/KR2019/017311, filed Dec. 9, 2019, claiming priorities to Korean Patent Application No. 10-2018-0157356, filed Dec. 7, 2018 and Korean Patent Application No. 10-2019-0162788, filed Dec. 9, 2019

TECHNICAL FIELD

Embodiments disclosed herein relate to a query response device and method that perform hierarchical video story modeling and make a response to a query about a video by using the results of the modeling.

Year 2019 Project Information and Acknowledgments
1-1. Project Serial No.: 1711081135
1-2. Acknowledgments: This research was conducted as a part of the Innovation-driven Growth Engine Project sponsored by the Korean Ministry of Science and ICT and the Institute for Information and Communications Technology Promotion (IITP-2017-0-01772-003).
2-1. Project Serial No.: 1711081008
2-2. Acknowledgments: This research was conducted as a part of the SW Computing Industry Fundamental Technology Development Project (R&D, informatization) sponsored by the Korean Ministry of Science and ICT and the Institute for Information and Communications Technology Promotion (IITP-2015-0-00310-005).

BACKGROUND ART

Recently, the field of video story modeling is newly emerging as a highly challenging field in which visual processing research and natural language processing research are converged together. Visual Question Answering (VQA) technology is a representative technology that deals with the area in which visual processing and natural language processing are converged together. VQA technology analyzes data contained in a video and infers a response to a query accordingly so that it can make a response to a query about a meaning or plot contained in the video.

However, a video story query response issue has been evaluated as a field that is difficult to deal with due to an increase in difficulty attributable to the characteristic of videos itself in which a lot of information is contained unlike in simple images and the various types of queries which result from the characteristic of videos.

Accordingly, it is difficult to collect a data set, and currently preceding video story query response data sets have various limitations.

Furthermore, conventional video query response models use only the caption and image frame information of a video, so that a problem arises in that it is difficult to use information about a speaker or emotion that is contained in the voice of a character but is not inferred from a caption or images.

Therefore, there is a demand for a method that can mitigate the difficulty of a response to a video query and, at the same time, can identify a speaker and an emotion and infer an appropriate response to a query.

Meanwhile, the above-described background technology corresponds to technical information that has been possessed by the present inventor in order to contrive the present invention or that has been acquired in the process of contriving the present invention, and can not necessarily be regarded as well-known technology that had been known to the public prior to the filing of the present invention.

DISCLOSURE

Technical Problem

Objects of embodiments disclosed herein are to propose a query response device and method.

Objects of embodiments disclosed herein are to propose a query response device and method that make a response to a query about a video story by using attention based on the query.

Objects of embodiments disclosed herein are to propose a query response device and method that hierarchically model a video story and make a response to a query based on the results of the modeling.

Furthermore, objects of embodiments disclosed herein are to propose a query response device and method that identify a speaker or an emotion by using audio information, included in a video data set, together with image frames and caption information and then make an appropriate response to a query.

Technical Solution

A query response method that is performed by a query response device includes: dividing image frames, audio data and caption data included in video data of a data set on a per-shot basis based on the same single caption; extracting a shot feature vector by calculating the feature vectors of image frames, audio data and caption data included in each shot; extracting feature vectors of query data and a plurality of pieces of option data corresponding to the query data from each query-response pair included in the data set; calculating a video feature vector by inputting the shot feature vectors into a multilayer neural network, assigning an attention weight, calculated based on the feature vector of the query data, to output vectors of respective layers, and then summing the weighted output vectors; and selecting a final response from among the plurality of pieces of option data based on similarities between the video feature vector and option feature vectors.

Advantageous Effects

According to any one of the above-described technical solutions, there may be provided the query response device and method.

According to any one of the above-described technical solutions, there may be provided the query response device and method that make a response to a query about a video story by using attention based on the query.

According to any one of the above-described technical solutions, there may be provided the query response device and method that hierarchically model a video story and make a response to a query based on the results of the modeling.

According to any one of the above-described technical solutions, there may be provided the query response device and method that identify a speaker or an emotion by using audio information, included in a video data set, together with image frames and caption information and then make an appropriate response to a query.

The effects that can be obtained by the embodiments disclosed herein are not limited to the above-described effects, and other effects that have not been described above will be clearly understood by those having ordinary skill in the art, to which the present invention pertains, from the following description.

BEST MODE

As a technical solution for solving the above-described technical problems, according to an embodiment, there is provided a query response method, the query response method being performed by a query response device, the query response method including: dividing image frames, audio data and caption data included in video data of a data set on a per-shot basis based on the same single caption; extracting a shot feature vector by calculating the feature vectors of image frames, audio data and caption data included in each shot; extracting feature vectors of query data and a plurality of pieces of option data corresponding to the query data from each query-response pair included in the data set; calculating a video feature vector by inputting the shot feature vectors into a multilayer neural network, assigning an attention weight, calculated based on the feature vector of the query data, to output vectors of respective layers, and then summing the weighted output vectors; and selecting a final response from among the plurality of pieces of option data based on the similarities between the video feature vector and option feature vectors.

According to another embodiment, there is provided a query response device including: a storage unit configured to store a data set including video data and a query-response pair; and a control unit configured to divide image frames, audio data and caption data, included in the video data, on a per-shot basis based on the same single caption, to extract a shot feature vector by analyzing image frames, audio data and caption data included in each shot, to input the shot feature vector into a multilayer neural network, to extract the feature vectors of query data and a plurality of pieces of option data corresponding to the query data from the query-response pair, to calculate a video feature vector by using the output vectors of the respectively layers of the multilayer neural network, and to select a final response from among the plurality pieces of option data based on the similarities between the video feature vector and option feature vectors.

According to still another embodiment, there is provided a computer-readable storage medium having stored thereon a program that performs a query response method, wherein the query response method includes: dividing image frames, audio data and caption data included in video data of a data set on a per-shot basis based on the same single caption; extracting a shot feature vector by calculating the feature vectors of image frames, audio data and caption data included in each shot; extracting feature vectors of query data and a plurality of pieces of option data corresponding to the query data from each query-response pair included in the data set; calculating a video feature vector by inputting the shot feature vectors into a multilayer neural network, assigning an attention weight, calculated based on the feature vector of the query data, to output vectors of respective layers, and then summing the weighted output vectors; and selecting a final response from among the plurality of pieces of option data based on the similarities between the video feature vector and option feature vectors.

According to still another embodiment, there is provided a computer program that is executed by a query response device and stored in a computer-readable medium to perform a query response method, wherein the query response method includes: dividing image frames, audio data and caption data included in video data of a data set on a per-shot basis based on the same single caption; extracting a shot feature vector by calculating the feature vectors of image frames, audio data and caption data included in each shot; extracting feature vectors of query data and a plurality of pieces of option data corresponding to the query data from each query-response pair included in the data set; calculating a video feature vector by inputting the shot feature vectors into a multilayer neural network, assigning an attention weight, calculated based on the feature vector of the query data, to output vectors of respective layers, and then summing the weighted output vectors; and selecting a final response from among the plurality of pieces of option data based on the similarities between the video feature vector and option feature vectors.

Mode for Invention

Various embodiments will be described in detail below with reference to the accompanying drawings. The following embodiments may be modified to various different forms and then practiced. In order to more clearly illustrate features of the embodiments, detailed descriptions of items that are well known to those having ordinary skill in the art to which the following embodiments pertain will be omitted. Furthermore, in the drawings, portions unrelated to descriptions of the embodiments will be omitted. Throughout the specification, like reference symbols will be assigned to like portions.

Throughout the specification, when one component is described as being "connected" to another component, this includes not only a case where the one component is "directly connected" to the other component but also a case where the one component is "connected to the other component with a third component disposed therebetween." Furthermore, when one portion is described as "including" one component, this does not mean that the portion does not exclude another component but means that the portion may further include another component, unless explicitly described to the contrary.

The embodiments will be described in detail below with reference to the accompanying drawings.

Figure 1:
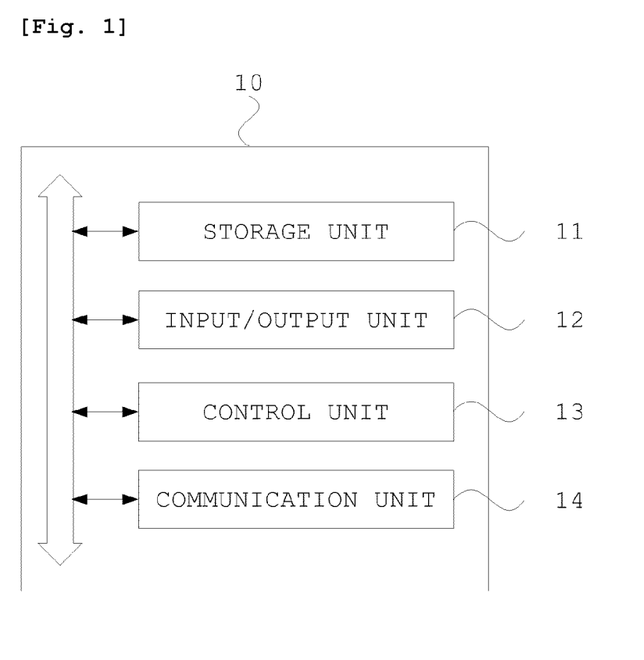
FIG. 1 is a diagram showing the configuration of a query response device according to an embodiment.

FIG. 1 is a diagram showing the configuration of a query response device according to an embodiment. A query response device 10 may be configured as an information processing device that calculates an optimal response to a query about a video by analyzing the video.

More specifically, the query response device 10 may include a storage unit 11, an input/output unit 12, a control unit 13, and a communication unit 14.

The storage unit 11 may store various types of data or programs required for responses to queries. The storage unit 11 may store a data set required for the process of training for a response to a query about a video. In this case, the data set may include information about image frames, audio data, and caption data included in video data, query data corresponding to the corresponding video data, option data for a response, and correct response data. In particular, the data set may include all of a training set, a validation set, and a test set for a video.

Furthermore, the storage unit 11 may at least temporarily hold or update a program configured to enable the training for a response to a query for a video and also enable the making of a response to a query accordingly, and a model used for training and a response to a query or data associated with a neural network.

Meanwhile, the input/output unit 12 is a component that receives data or a user command, calculates data in response to the input of a user, and outputs the results of the processing. According to an embodiment, the input/output unit 12 may include a user input means such as a keyboard, a mouse or a touch panel, and an output means such as a monitor or a speaker.

Furthermore, the control unit 13 is a component that includes at least one processor such as a CPU, and may control the overall operation and configuration of the query response device 10. In particular, the control unit 13 may perform video story modeling by executing or reading the program or data stored in the storage unit 11 and select an appropriate response to a query accordingly.

In particular, the control unit 13 models a video plot by analyzing the image frames, audio and caption of a video. A detailed process in which the control unit 13 models a video story and makes a response to a query accordingly will be described in greater detail later.

Meanwhile, the communication unit 14 is a component that allows the query response device 10 to exchange data with another device. The communication unit 14 may receive a video data set to be analyzed by the control unit 13, or may receive and provide data related to a neural network required in a process in which the control unit 13 analyzes the video data set or models a video story using the video data set. Furthermore, the communication unit 14 may transfer a query, received from another terminal, to the control unit 13 or provide a response, calculated by the control unit 13, to the other terminal while communicating with the other terminal.

Figure 2:
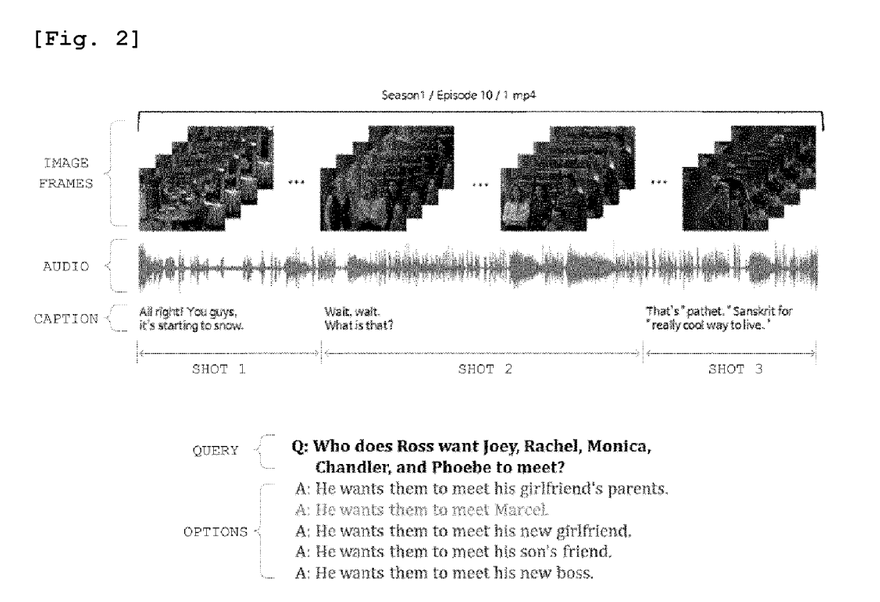
FIG. 2 is a diagram showing an example of a data set that is used in the query response device according to the embodiment.

A detailed query response process that is performed by the query response device 10 will be described below. However, prior to this, a data set that is used for video story modeling will be first described. FIG. 2 is a diagram showing an example of a data set that is used in a query response device according to an embodiment.

First, as shown in FIG. 2, a video data set includes image frames, audio data, and caption data constituting specific video content. Furthermore, the data set includes a query-response pair. In this case, the query-response pair may include query data and data on a plurality of options for a query. Furthermore, in this case, correct response data may be included among the options such that the correct response data is distinguishable from the other options.

The embodiment shown in FIG. 2 shows a Friends query response data set including a query-response pair for a video of the American drama 'Friends.' As shown in the drawing, the data set includes the image frames, audio data and caption data of scenes constituting a specific episode, and also includes query data and one or more pieces of option data, including a corresponding correct response, for a related video.

In an embodiment, image frames, audio data, and caption data may be divided on a per-shot basis based on the caption data. In other words, a set of image frames, audio data and corresponding caption data within a time range in which one caption is displayed may be divided as one shot.

A query response method that is performed by the query response device 10 will be described with reference to FIGS. 3 to 5.

Figure 3:
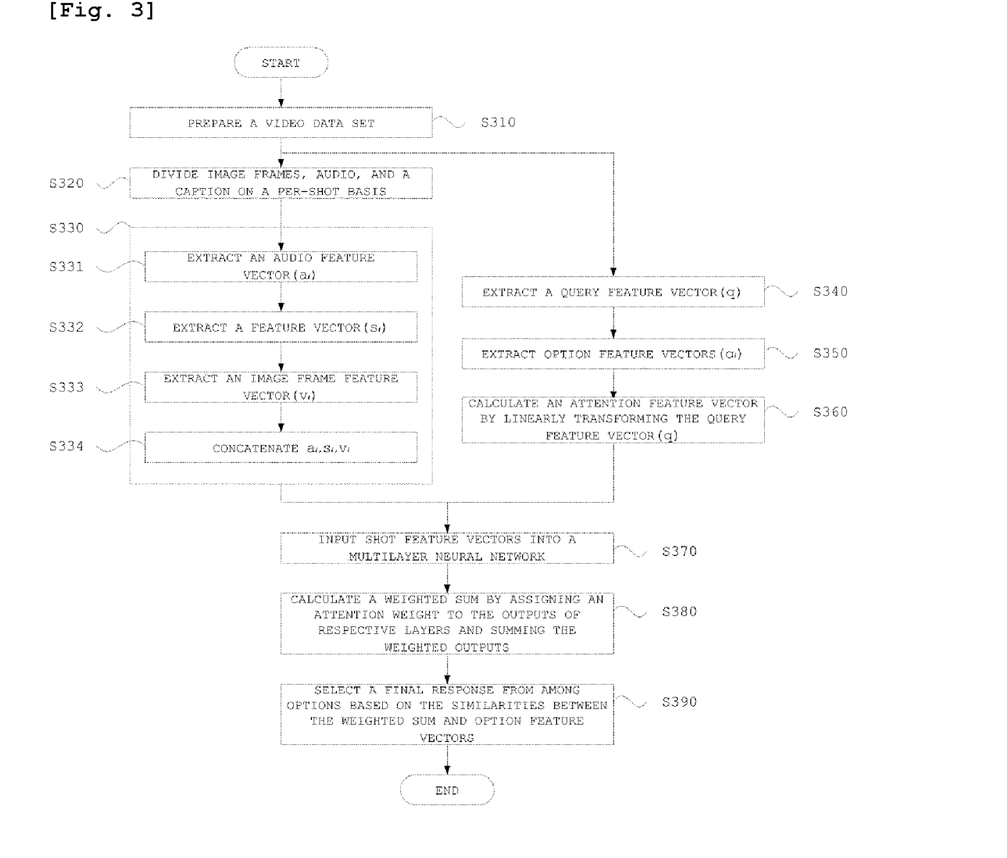
FIG. 3 is a diagram showing a query response method that is performed by the query response device according to the embodiment in a stepwise manner.
Figure 4:
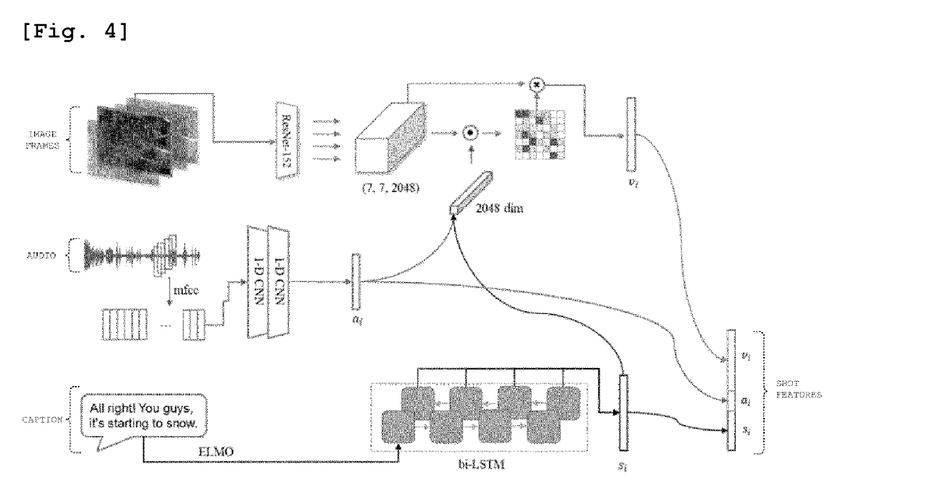
FIG. 4 is a diagram conceptually showing the step of extracting a shot feature in the query response method according to an embodiment.
Figure 5:
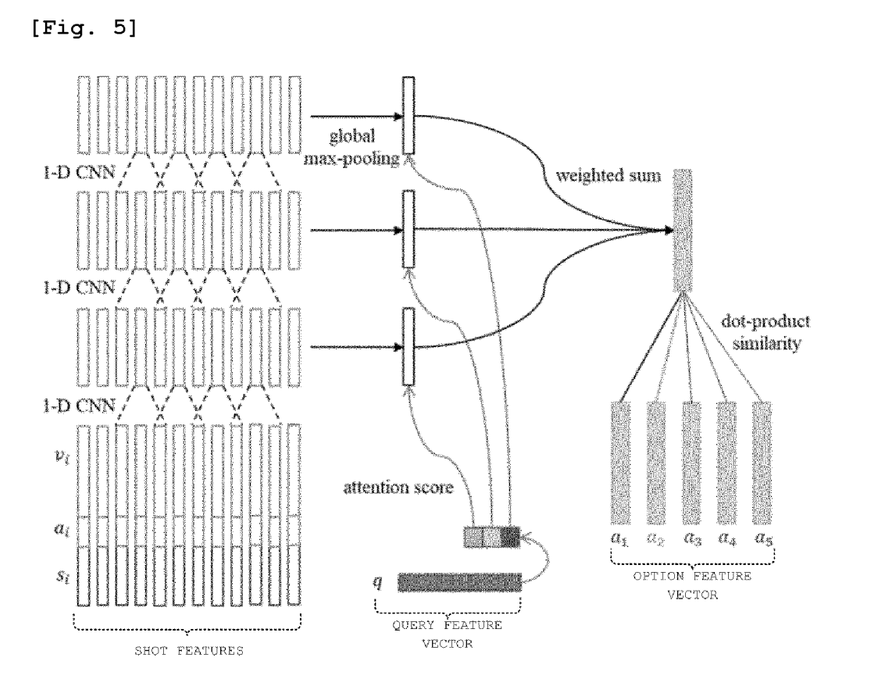
FIG. 5 is a diagram conceptually showing the step of selecting a final response to a query in the query response method according to the embodiment.

FIG. 3 is a diagram showing a query response method that is performed by the query response device according to the embodiment in a stepwise manner, FIG. 4 is a diagram conceptually showing the step of extracting a shot feature in the query response method according to the embodiment, and FIG. 5 is a diagram conceptually showing the step of selecting a final response to a query in the query response method according to the embodiment.

As shown in the drawings, the query response device 10 prepares a video data set on which video story modeling will be performed at step S310.

In this case, the data set may include image frames, audio data and caption data constituting a video, and query data and option data constituting a query-response pair, as described above.

Furthermore, the query response device 10 may divide the image frames, the audio data and the caption data on a per-shot basis. In other words, the query response device 10 divides one segment from the start of one caption to the end thereof as each shop at step S320.

In this case, the video divided into shots may be defined as $X=\{vi, ai, si\}_{i=1, \ldots, |X|}$. In this equation, vi is the feature vector of an image sequence, ai is the feature vector of an extracted audio, and si is a feature vector calculated by performing word embedding on a caption. Furthermore, the features of each shot may be represented by a set of feature vectors.

Thereafter, the query response device 10 extracts the features of each shot at step S330.

In this case, step S330 of extracting the features of each shot may be subdivided into steps S331 to S334.

First, the query response device 10 may extract an audio feature vector ai at step S331. At step S331, the step of extracting the features of sound included in the audio data is performed. According to the embodiment shown in FIG. 4, step S331 may be performed using a convolution neural network (CNN) model based on Mel-Frequency Cepstral Coefficients (MFCC). The lowest 39-dimensional features are extracted by applying a 40 ms Hamming window to the audio data of one shot at intervals with an overlap of 25 ms. A 1-D CNN having a large number of filters may be applied to the extracted N (39)-dimensional features twice, and fixed-dimensional audio features may be extracted using global max pooling. Furthermore, a 300-dimensional audio feature vector ai may be extracted by applying one fully connected layer to the extracted audio features.

Meanwhile, the query response device 10 may extract a caption feature vector si at step S332. At step S332, the query response device 10 calculates a fixed-dimensional feature vector by performing word embedding using a natural language processing model and then inputting per-word features into a neural network model. According to the embodiment shown in FIG. 4, the query response device 10 obtains a fixed-dimensional feature vector by performing word embedding using a pre-trained model for natural language processing and then inputting per-word features into a long short-term memory (LSTM) model, thereby calculating a caption feature vector si at step S332.

Meanwhile, although not shown in FIG. 3, the audio feature vector ai and the caption feature vector si may be used as the attention feature vector of an image feature vector vi through multimodal joint embedding, as in the embodiment shown in FIG. 4. More specifically, a joint embedding vector ei may be generated by embedding the audio feature vector ai and the caption feature vector si in the same dimensions as the image feature vector vi to be described later and then summing them. Furthermore, the query response device 10 may use the joint embedding vector ei as the attention feature vector in the process of calculating the image frame feature vector vi.

Meanwhile, the query response device 10 may extract an image frame feature vector vi for each shot at step S333. At this step, the query response device 10 may sample three image frames for one shot per second. Furthermore, the query response device 10 may calculate a feature vector for each image by inputting a sampled image into a neural network.

For example, in the embodiment shown in FIG. 4, the query response device 10 may extract a (7, 7, 2048)-dimensional tensor by applying ImageNet pre-trained ResNet-152 to each sampled image. Furthermore, a (7, 7)-dimensional attention map is obtained by performing the dot product of the extracted tensor and the joint embedding vector ei obtained above. Furthermore, the query response device 10 may obtain a feature vector by multiplying each attention weight included in the attention map by the extracted tensor and then summing all 49 2,048-dimensional feature vectors. A feature vector having a variable length may be obtained for one shot by obtaining feature vectors for the image frames in the above-described manner. These may be averaged and represented as an image frame feature vector vi for one shot.

In addition, the query response device 10 may obtain one shot feature vector by concatenating three feature vectors obtained for one shot.

Meanwhile, the query response device 10 may calculate a query feature vector q for each query at step S340, and may extract an option feature vector ai for each option at step S350. In this case, in order to extract the feature vectors of the query and the options composed in natural language, the query response device 10 may calculate fixed-dimensional feature vectors by performing word embedding using a natural language processing model and then inputting per-word features into a neural network model in the same manner as in the case of extracting the caption feature vector si. For example, as shown in FIG. 4, the query response device 10 may obtain fixed-dimensional feature vectors by performing word embedding using a pre-trained model for natural language processing and then inputting per-word features as the input of an LSTM model, thereby extracting the query feature vector q and the option feature vectors ai.

Meanwhile, at step S360, the query response device 10 may calculate an attention feature vector, which will be used at step S380 to be described later, by linearly transforming the query feature vector q.

Meanwhile, the query response device 10 may hierarchically represent the individual shot feature vectors, calculated through step S330, through multilayer convolution. A model proposed in an embodiment is a method using a multilayer neural network, e.g., a 3-layer 1-D CNN. The query response device 10 may embed the shot feature vectors in the respective three layers of the 1-D CNN at step S370.

Furthermore, the query response device 10 may calculate the output vectors of various levels by performing global max-pooling.

Thereafter, the query response device 10 may calculate a weighted sum by assigning each attention weight, included in the attention feature vector calculated in step S360, to the output vectors of the respective layers and then summing them at step S380. Since this weighted sum has paid attention to the query, it becomes the most appropriate 'video feature vector' for the query.

Furthermore, the query response device 10 selects one final response from among the plurality of options based on the dot-product similarities between the video feature vector and the option feature vectors ai.

Meanwhile, the query response device 10 may train the multilayer neural network so that a final response becomes a preset correct response while repeating the above-described process for a plurality of query-response pairs.

Moreover, the query response device 10 may provide a user with an appropriate response corresponding to the user's query by using the multilayer neural network trained through the above-described data set.

The term 'unit' used in the above-described embodiments means software or a hardware component such as a field-programmable gate array (FPGA) or application-specific integrated circuit (ASIC), and a 'unit' performs a specific role. However, a 'unit' is not limited to software or hardware. A 'unit' may be configured to be present in an addressable storage medium, and also may be configured to run one or more processors. Accordingly, as an example, a 'unit' includes components, such as software components, object-oriented software components, class components and task components, processes, functions, attributes, procedures, subroutines, segments in program code, drivers, firmware, microcode, circuits, data, a database, data structures, tables, arrays, and variables.

Each of the functions provided in components and 'unit(s)' may be coupled to a smaller number of components and 'unit(s)' or divided into a larger number of components and 'unit(s).'

In addition, components and 'unit(s)' may be implemented to run one or more CPUs in a device or secure multimedia card.

Furthermore, the query response method according to an embodiment may be implemented as a computer program (or a computer program product) including computer-executable instructions. The computer program includes programmable machine instructions that are processed by a processor, and may be implemented as a high-level programming language, an object-oriented programming language, an assembly language, a machine language, or the like. Furthermore, the computer program may be stored in a tangible computer-readable storage medium (for example, memory, a hard disk, a magnetic/optical medium, a solid-state drive (SSD), or the like).

Accordingly, the query response method according to an embodiment may be implemented in such a manner that the above-described computer program is executed by a computing apparatus. The computing apparatus may include at least some of a processor, memory, a storage device, a high-speed interface connected to memory and a high-speed expansion port, and a low-speed interface connected to a low-speed bus and a storage device. These individual components are connected using various buses, and may be mounted on a common motherboard or using another appropriate method.

In this case, the processor may process instructions within a computing apparatus. An example of the instructions is instructions which are stored in memory or a storage device in order to display graphic information for providing a Graphic User Interface (GUI) onto an external input/output device, such as a display connected to a high-speed interface. As another embodiment, a plurality of processors and/or a plurality of buses may be appropriately used along with a plurality of pieces of memory. Furthermore, the processor may be implemented as a chipset composed of chips including a plurality of independent analog and/or digital processors.

Furthermore, the memory stores information within the computing device. As an example, the memory may include a volatile memory unit or a set of the volatile memory units. As another example, the memory may include a non-volatile memory unit or a set of the non-volatile memory units. Furthermore, the memory may be another type of computer-readable medium, such as a magnetic or optical disk.

In addition, the storage device may provide a large storage space to the computing device. The storage device may be a computer-readable medium, or may be a configuration including such a computer-readable medium. For example, the storage device may also include devices within a storage area network (SAN) or other elements, and may be a floppy disk device, a hard disk device, an optical disk device, a tape device, flash memory, or a similar semiconductor memory device or array.

The above-described embodiments are intended for illustrative purposes. It will be understood that those having ordinary knowledge in the art to which the above-described embodiments pertain can easily make modifications and variations without changing the technical spirit and essential features of the above-described embodiments. Therefore, the above-described embodiments are illustrative and are not limitative in all aspects. For example, each component described as being in a single form may be practiced in a distributed form. In the same manner, components described as being in a distributed form may be practiced in an integrated form.

The scope of protection pursued via the present specification should be defined by the attached claims, rather than the detailed description. All modifications and variations which can be derived from the meanings, scopes and equivalents of the claims should be construed as falling within the scope of the present invention.

The invention claimed is:

1. A query response method, the query response method being performed by a query response device, the query response method comprising:
dividing image frames, audio data and caption data included in video data of a data set on a per-shot basis based on a same single caption;
extracting a shot feature vector by calculating feature vectors of image frames, audio data and caption data included in each shot;
extracting feature vectors of query data and a plurality of pieces of option data corresponding to the query data from each query-response pair included in the data set;
calculating a video feature vector by inputting the shot feature vectors into a multilayer neural network, assigning an attention weight, calculated based on the feature vector of the query data, to output vectors of respective layers, and then summing the weighted output vectors; and
selecting a final response from among the plurality of pieces of option data based on similarities between the video feature vector and option feature vectors.

2. The query response method of claim 1, further comprising repeatedly training the multilayer neural network so that for a plurality of query-response pairs, the final response becomes a preset correct response among the plurality of pieces of option data for each query-response pair.

3. The query response method of claim 1, wherein extracting the shot feature vector comprises:
extracting an audio feature vector ($a_i$);
extracting a caption feature vector ($s_i$); and
extracting an image frame feature vector ($v_i$).

4. The query response method of claim 3, wherein extracting the shot feature vector comprises:
calculating the shot feature vector by concatenating the audio feature vector ($a_i$), the caption feature vector ($s_i$), and the image frame feature vector ($v_i$).

5. The query response method of claim 4, wherein extracting the image frame feature vector ($v_i$) comprises:
obtaining a joint embedding vector ($e_i$) having same dimensions as the image frame feature vector ($v_i$) by performing multimodal joint embedding on the audio feature vector ($a_i$) and the caption feature vector ($s_i$), and calculating the image frame feature vector ($v_i$) by using an attention weight included in the joint embedding vector ($e_i$).

6. The query response method of claim 1, wherein the multilayer neural network is a three-layer 1-D CNN.

7. A query response device comprising:
a memory configured to store a data set including video data and a query-response pair; and
a controller configured to divide image frames, audio data and caption data, included in the video data, on a per-shot basis based on a same single caption, to extract a shot feature vector by analyzing image frames, audio data and caption data included in each shot, to input the shot feature vector into a multilayer neural network, to extract feature vectors of query data and a plurality of pieces of option data corresponding to the query data from the query-response pair, to calculate a video feature vector by using output vectors of respective layers of the multilayer neural network, and to select a final response from among the plurality pieces of option data based on similarities between the video feature vector and option feature vectors.

8. The query response device of claim 7, wherein the controller assigns an attention weight, calculated based on the feature vector of the query data, to the output vectors of the respective layers, and then sums the weighted output vectors.

9. The query response device of claim 7, wherein the controller repeatedly trains the multilayer neural network so that for a plurality of query-response pairs, the final response becomes a preset correct response among the plurality of pieces of option data for each query-response pair.

10. The query response device of claim 7, wherein the controller calculates the shot feature vector by extracting an audio feature vector ($a_i$), a caption feature vector ($s_i$) and an image frame feature vector ($v_i$) and then concatenating the audio feature vector ($a_i$), the caption feature vector ($s_i$) and the image frame feature vector ($v_i$).

11. The query response device of claim 10, wherein the control unit obtains a joint embedding vector ($e_i$) having same dimensions as the image frame feature vector ($v_i$) by performing multimodal joint embedding on the audio feature vector ($a_i$) and the caption feature vector ($s_i$), and calculates the image frame feature vector (vi) by using an attention weight included in the joint embedding vector (ei).

12. A non-transitory machine readable storage medium having stored thereon a program that performs the method set forth in claim 1.

13. A computer program that is executed by a query response device and stored in a computer-readable medium to perform the method set forth in claim 1.

* * * * *